United States Patent
Hayami et al.

(10) Patent No.: US 6,293,686 B1
(45) Date of Patent: Sep. 25, 2001

(54) LIGHTING DEVICE FOR VEHICLES

(75) Inventors: Toshihisa Hayami; Hiroyuki Ishida; Hideki Uchida; Atsushi Sugimoto, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/507,896

(22) Filed: Feb. 22, 2000

(30) Foreign Application Priority Data

Feb. 22, 1999 (JP) .................................................. 11-43343

(51) Int. Cl.⁷ .............................. B60Q 1/00; F21V 21/28
(52) U.S. Cl. .................. 362/465; 362/464; 362/466; 362/276; 362/36; 362/37; 362/802; 315/81; 315/82; 307/10.8; 340/468
(58) Field of Search ...................... 362/36, 37, 43, 362/465, 464, 276, 49, 802; 315/81, 82; 307/10.8; 340/468

(56) References Cited

U.S. PATENT DOCUMENTS

| 3,855,462 | 12/1974 | Kondo . |
| 4,951,178 | 8/1990 | Shirai et al. . |
| 5,339,226 | 8/1994 | Ishikawa . |
| 5,343,371 | 8/1994 | Kobayahi et al. . |
| 5,373,424 | 12/1994 | Ishikawa . |
| 5,379,196 | 1/1995 | Kobayahi et al. . |
| 5,404,278 | 4/1995 | Shibata et al. . |
| 5,488,546 | 1/1996 | Sato et al. . |
| 5,614,788 | 3/1997 | Mullins et al. . |
| 5,645,338 | * 7/1997 | Kobayashi ............................. 362/61 |
| 5,660,454 | * 8/1997 | Mori et al. ............................. 362/61 |
| 5,707,129 | 1/1998 | Kobayashi . |
| 6,049,749 | * 4/2000 | Kobayashi ............................. 701/49 |
| 6,176,590 | * 1/2001 | Prevost et al. ......................... 362/37 |

FOREIGN PATENT DOCUMENTS 0 761 497 A2  3/1997 (EP) .
0 864 462 A1  9/1998 (EP) .

* cited by examiner

Primary Examiner—Thomas M. Sember
Assistant Examiner—Ali Alavi
(74) Attorney, Agent, or Firm—Sughrue, Mion, Zinn, Macpeak & Seas, PLLC

(57) ABSTRACT

The lighting device for a vehicle includes running direction detect means 3 for detecting the vehicle running direction or the vehicle steering angle and vehicle speed detect means 4 for detecting the vehicle speed. An illumination control means 5 specifies the turn-on and turn-off of a plurality of lamps in accordance with detect signals output from the means 3 and 4, thereby changing the combinations of the illumination ranges of the lamps.

26 Claims, 8 Drawing Sheets

WHEN SUB-BEAM TURNED ON

TURN ON : ○
TURN OFF : ×

| NAME OF MODE \ NAME OF LAMP | HEAD LAMP (OF OPTICAL AXIS CONTROL TYPE) | STEERING ANGLE 30°→20° RAIN LAMP | 90°→70° BENDING LAMP | 180°→160° CORNERING LAMP | CUT LINE SHAPE HEAD LAMP | IN BAD WHATHER RAIN LAMP | WHEN TURNED ON CORNERING LAMP |
|---|---|---|---|---|---|---|---|
| CITY AREA RUNNING MODE (50km/h 30km/h) | HEAD LAMPS SWUNG OUTWARDLY 5° AND FIXED REGARDLESS OF STEERING ANGLE | ○ | ○ | ○ | SEE FIG.12 | ○ (BOTH SIDES) | ○ |
| SUBURBS RUNNING MODE (90km/h 70km/h) | STEERING ANGLE 0° — 7°→30° / AXIS OF LIGHT 0° — 0°→5° INSENSITIVE ZONE | ○ | ○ | × | SEE FIG.12 | ○ (BOTH SIDES) | ○ |
| HIGH SPEED RUNNING MODE | STEERING ANGLE 0° — 5°→30° / AXIS OF LIGHT 0° — 0°→5° INSENSITIVE ZONE | ○ | × | × | ↑0.5°UP SEE FIG.13 | ○ (BOTH SIDES) | × |

WHEN MAIN BEAM TURNED ON

TURN ON : ○
TURN OFF : ×

| NAME OF MODE \ NAME OF LAMP | HEAD LAMP (OF OPTICAL AXIS CONTROL TYPE) | STEERING ANGLE 30°→20° RAIN LAMP | 90°→70° BENDING LAMP | 180°→160° CORNERING LAMP | MAIN BEAM SHAPE HEAD LAMP | IN BAD WHATHER RAIN LAMP | WHEN TURNED ON CORNERING LAMP |
|---|---|---|---|---|---|---|---|
| CITY AREA RUNNING MODE (50km/h 30km/h) | HEAD LAMPS SWUNG OUTWARDLY 5° AND FIXED REGARDLESS OF STEERING ANGLE | ○ | ○ | ○ | ↑1.5°UP SEE FIG.14 | ○ (BOTH SIDES) | ○ |
| SUBURBS RUNNING MODE (90km/h 70km/h) | STEERING ANGLE 0° — 7°→30° / AXIS OF LIGHT 0° — 0°→5° INSENSITIVE ZONE | ○ | ○ | × | ↑1.5°UP SEE FIG.14 | ○ (BOTH SIDES) | ○ |
| HIGH SPEED RUNNING MODE | STEERING ANGLE 0° — 5°→30° / AXIS OF LIGHT 0° — 0°→5° INSENSITIVE ZONE | ○ | × | × | ↑1.5°UP SEE FIG.14 | ○ (BOTH SIDES) | × |

LIGHTING DEVICE FOR VEHICLES

BACKGROUND OF THE INVENTION

1. Field of the Invention

The present invention relates to a lighting device disposed in the front portion of a vehicle in the advancing direction of the vehicle and including a plurality of lamps and, in particular, to a lighting device having a structure that changes combinations of illumination ranges provided by the plurality of lamps, thereby specifying the control of the light distribution.

2. Description of the Related Art

Conventionally, there is known a device which detects the steering angle of a vehicle to change the illumination direction of a lamp according to variations in the detected steering angle. Such a device enhances vehicle safety, especially when driving through curves at night.

Although the conventional device is generally though. to be acceptable, it is not without shortcomings. In particular, the conventional device exerts control over illumination direction only when the vehicle travels through a curve. That is, the direction of part of an illumination light is changed successively according to the steering angle when the vehicle runs in the curve. Therefore, the conventional device does not sufficiently illuminate a road sign, a pedestrian, a preceding vehicle, an oncoming vehicle, an obstacle or the like.

SUMMARY OF THE INVENTION

In view of the above, it is an object of the invention to provide a lighting device which changes the combinations of illumination ranges provided by a plurality of lamps according to not only the running direction or steering angle of a vehicle, but also the speed of the vehicle to thereby control direction and range of illumination so to maintain constant light distribution control, which is proper for the vehicle's running condition.

In order to achieve the objectives, the present lighting device for a vehicle includes a plurality of lamps disposed in the front portion of the vehicle in the advancing direction thereof. The lighting device has running direction detect means for detecting the running direction or steering angle of the vehicle, vehicle speed detect means for detecting the speed of the vehicle, and illumination control means for specifying the turn-on or turn-off of the plurality of lamps in accordance with detect signals output from the running direction detect means and vehicle speed detect means to change the combinations of the illumination ranges of the lamps, thereby controlling the light distribution of the lighting device in front of the vehicle as well as laterally of the vehicle.

The combinations of the illumination ranges of the lamps are changed according to the running direction or steering angle of the vehicle and according to the vehicle speed to thereby control the direction and range of the illumination of the lighting device, so that the light distribution of the lighting device in front of the vehicle can be specified.

BRIEF DESCRIPTION OF THE DRAWINGS

FIG. 2, together with FIGS. 3 to 14, show a lighting device for a vehicle according to an embodiment of the present invention; and, in particular.

FIG. 5, together with FIGS. 6 to 10, show an example of the structure of another lamp (other than the head lamp); in particular.

FIG. 7, together with FIG. 8, schematically show a lamp structured such that the optical axis of its reflecting portion faces in a desired direction by rotating part of a reflecting mirror about a given axis; and, in particular.

FIG. 9, together with FIG. 10, show an example of the structure of a lamp having a function to control its light distribution in a variable manner; and, in particular.

FIG. 12, together with FIGS. 13 and 14, explain the light distribution patterns of a head lamp; and, in particular, FIG. 12 is a schematic view of a light distribution pattern in a city area running mode and in a suburbs running mode while a sub-beam is on;

FIG. 13 is a schemata, view of a light distribution pattern in high-speed running mode while the sub-beam is on; and FIG. 14 is a schematic view of another light distribution pattern while the sub-beam is on.

DETAILED DESCRIPTION OF THE INVENTION

Figure 1:
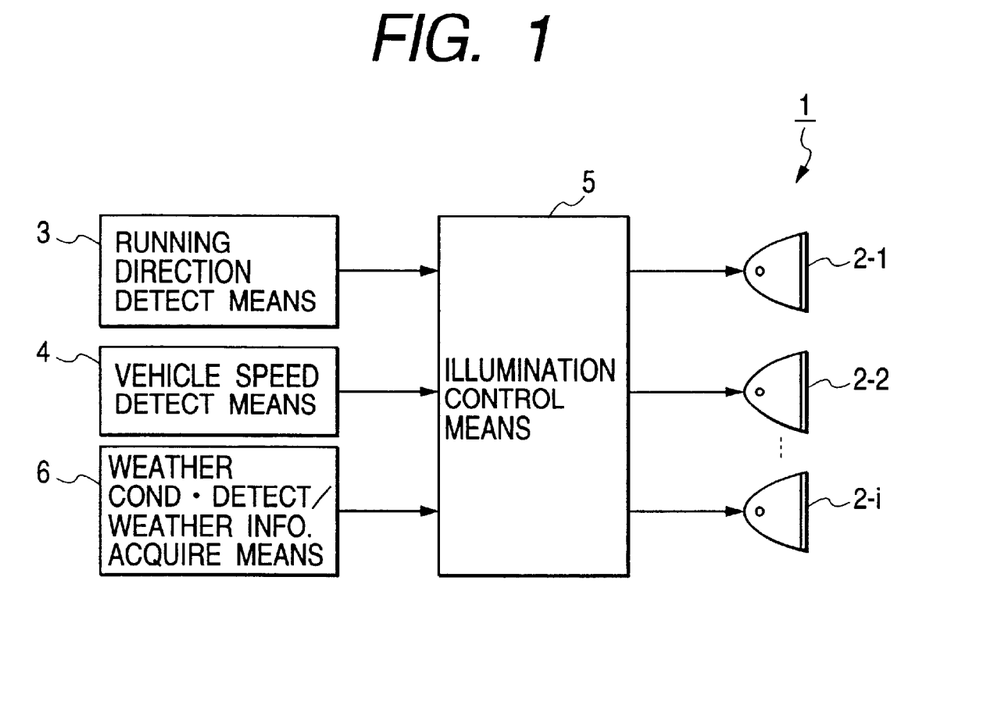
FIG. 1 is a block diagram of a lighting device for a vehicle according to an embodiment of the present invention.

FIG. 1 shows the basic structure of a lighting device for a vehicle 1 according to an embodiment of the present invention. The lighting device for a vehicle 1 includes a plurality of lamps 2-i (i=1, 2, . . .) disposed in the front portion of the vehicle in the advancing direction of the vehicle. The lighting device 1 combines together the illumination ranges of two or more of the lamps to control or change the light distribution of the lighting device 1. The lamps may include a head lamp, a cornering lamp, a rain lamp, a fog lamp, a bending lamp, and other similar lamps.

The lighting device for a vehicle 1 also includes running direction detect means 3 for detecting the running direction of a vehicle or the steering angle thereof, and vehicle speed detect means 4 for detecting the speed of the vehicle. The detected information is transmitted to illumination control means 5, which is disposed downstream of the running direction detect means 3 and the vehicle speed detect means 4.

The running direction detect means 3 may be, for example, a detect sensor for detecting a steering angle (such as the operation angle of a steering wheel or the like) and/or a detect sensor for detecting an instruction signal to a direction indicator. Also, the running direction detect means 3 may determine the current and following running direction of the vehicle based on road map information, including the shapes of a road and the current vehicle position information. Such information can be obtained, for example, from a navigation (route guide) system using a GPS (Global Positioning System) satellite, and a road-and-vehicle vehicle communication system (a system using facilities for connected a vehicle and a road by radio communication).

The vehicle speed detect means 4 may be, for example, a speed sensor equipped in the vehicle.

The illumination control means 5 turns the plurality of lamps 2-i (i=1, 2, . . .) on or off according to the signals received from the running direction detect means 3 and the vehicle speed detect means 4, thereby changing the combinations of the illumination ranges of the lamps. In this way, the illumination control means 5 controls the light distribution in front of and/or laterally of the vehicle. The illumination control means 5 sends signals to the respective lamps for turning them on or off.

For example, as the vehicle speed detected by the vehicle speed detect means 4 increases, the illumination control means 5 decreases the number of lamps to be turned on, thereby narrowing the illumination range of the lighting device. Accordingly, when the vehicle runs at a high speed, the illumination range provided by the lamps does not move right and left greatly, even if the steering angle of the steering wheel of the vehicle is changed by steering the steering wheel. Thus, the light distribution of the lighting device is stabilized, which makes it possible to prevent the illumination of the lamps from alarming road users (such as the drivers of other vehicles) and to prevent the glare of the lamps from dazzling the road users.

When the straight running of the vehicle is detected by the running direction detect means 3, the illumination control means 5 turns on only the lamps facing and illuminating in the advancing direction of the vehicle. When a variation in the running direction of the vehicle or in the steering angle is detected by the running direction detect means 3, the illumination control means turns on additional lamps. As the running direction variation increases, additional lamps are turned on one by one so that the lamps illuminate a wider range of area in a turning action of the vehicle. The illumination control means 5 turns on or off the respective lamps in stages, such that in right and left: turns, as well as in the curved road running, the lighting device 1 illuminates a direction where the vehicle is going to curve and also a wide range including such direction, which provides an advantage that a sufficient field of vision can be secured in front of a driver.

Typically, the vehicle's running environment varies depending on time and place. Preferably, therefore, the lighting device 1 includes weather condition detect or weather information acquire means 6 (see FIG. 1), which determine the weather condition in an area where the vehicle is running. When the illumination control means 5 receives a signal from ID the weather condition detect or weather information acquire means 6, and judges that the weather is inclement, the illumination control means 5 turns on the lamps for illuminating the lines on the road or the shoulder of the road. In this way, during inclement weather (such as rainy weather, cloudy weather, snowy weather, foggy weather, and the like), the lines on the road (such as a center line and the rain mark of the shoulder) remain visually confirmable to a driver.

The weather situation may be detected using two methods. One method detects the weather situation directly, and the other method detects the weather situation indirectly, i.e., the weather situation is pieced out from various kinds of indirect information. The direct method uses an image processing technique based on information obtained by a front photographing camera, or various sensors for respectively detecting raindrops, temperature and humidity, and peripheral illuminance, and the weather situation is detected synthetically according to various kinds of information from the sensors. On the other hand, the indirect method, for example, uses various kinds of information from devices such as a windshield wipers and the like that are operated in accordance with variations in the weather, that is, the operation signal of the wiper, and a signal showing the condition of the wiper. By the way, the weather information can also be acquired by using the above-described road-to-road communication, an FM multiple communication and other similar communication.

The illumination range of the lighting device may be controlled by a mechanism for causing the illuminating directions of the lamps to vary. For example, each of the lamps may include a drive mechanism for adjusting optical members forming the lamp, such as a reflecting mirror, a light shield member, and a lens. The illuminating directions of the lamps are variably controlled by signals that are applied from outside. However, if the illuminating range of the lighting device in front of and laterally of a vehicle is divided into a plurality of blocks, and if lamps differing in the illuminating direction from one another are used to illuminate their respective blocks individually to thereby specify the whole illuminating range of the lighting device, then the respective lamps can be structured in a simple manner (the light distributions of the respective lamps may remain fixed.), which provides an advantage that not only the number of parts but also the cost of the lighting device are reduced.

The lighting device 1 may include, for example, (1) a main lamp for illuminating the vehicle advancing direction (front direction), (2) a subordinate lamp for illuminating the lines on the road or the shoulder of the road, (3) a laterally illuminating lamp having an illuminating range extending from obliquely forwardly of the vehicle to laterally of the vehicle, and (4) an auxiliary lamp having an illuminating range extending between the illuminating range of the subordinate lamp and the illuminating range of the laterally illuminating lamp. These lamps illuminate a sufficient range in the field of view from the vehicle. In a car, for example, a head lamp corresponds to the main lamp, a rain lamp corresponds to the subordinate lamp, a cornering lamp corresponds to the laterally illuminating lamp, and a bending lamp corresponds to the auxiliary lamp. Preferably, in the front portion of a vehicle, the laterally illuminating lamp and the auxiliary lamp are arranged below the main and subordinate lamps.

The illumination control means 5 sends turn-on and turn-off signals to the lamps in a stage by stage manner. Such stage by stage control may cause part of the illumination range to suddenly brighten or darken. Preferably, therefore, lamps having overlapping (or contiguous) illumination ranges are turned on and off gradually. For example, when turning on (turning off) a second lamp after a first lamp is turned on (turned off), the light quantity of the second lamp is gradually increased (decreased) according to variations in the running direction of the vehicle or in the steering angle. Accordingly the brightness of the lamps are allowed to vary stage by stage or continuously in accordance with control signals from the illumination control means 5 to the respective lamps 2-i. For this purpose, for example, the light sources of the lamps (such as an incandescent lamp or a discharge lamp) may be controlled via electric currents, voltages, or supply powers.

EMBODIMENT

Figure 2:
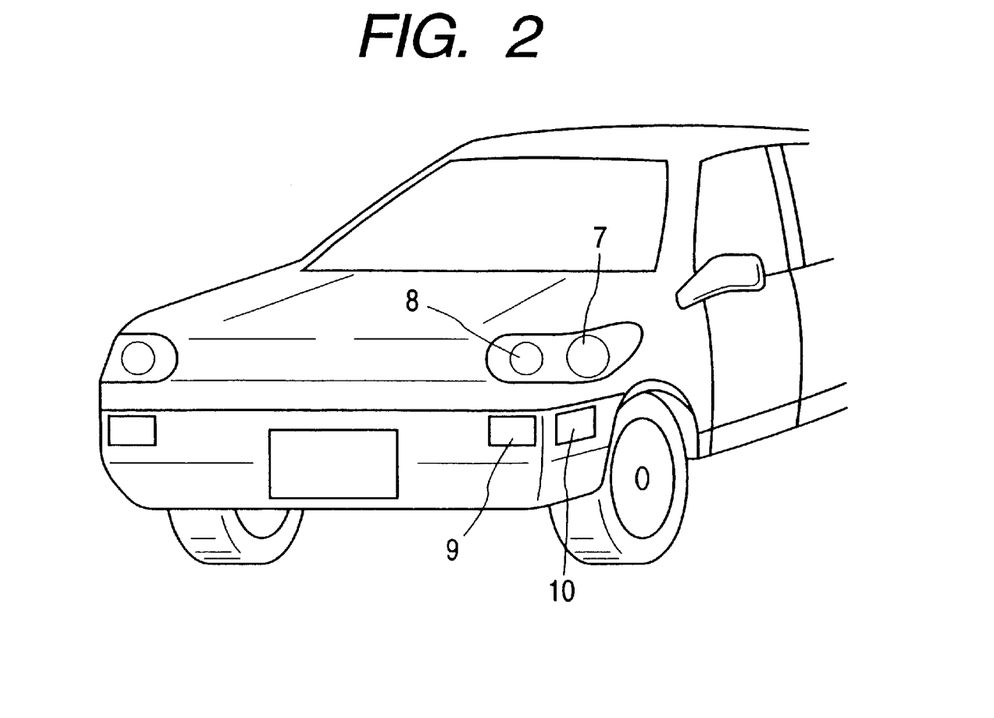
FIG. 2 is a schematic view of the lamps of the lighting device arranged in the front portion of a vehicle.
Figure 3:
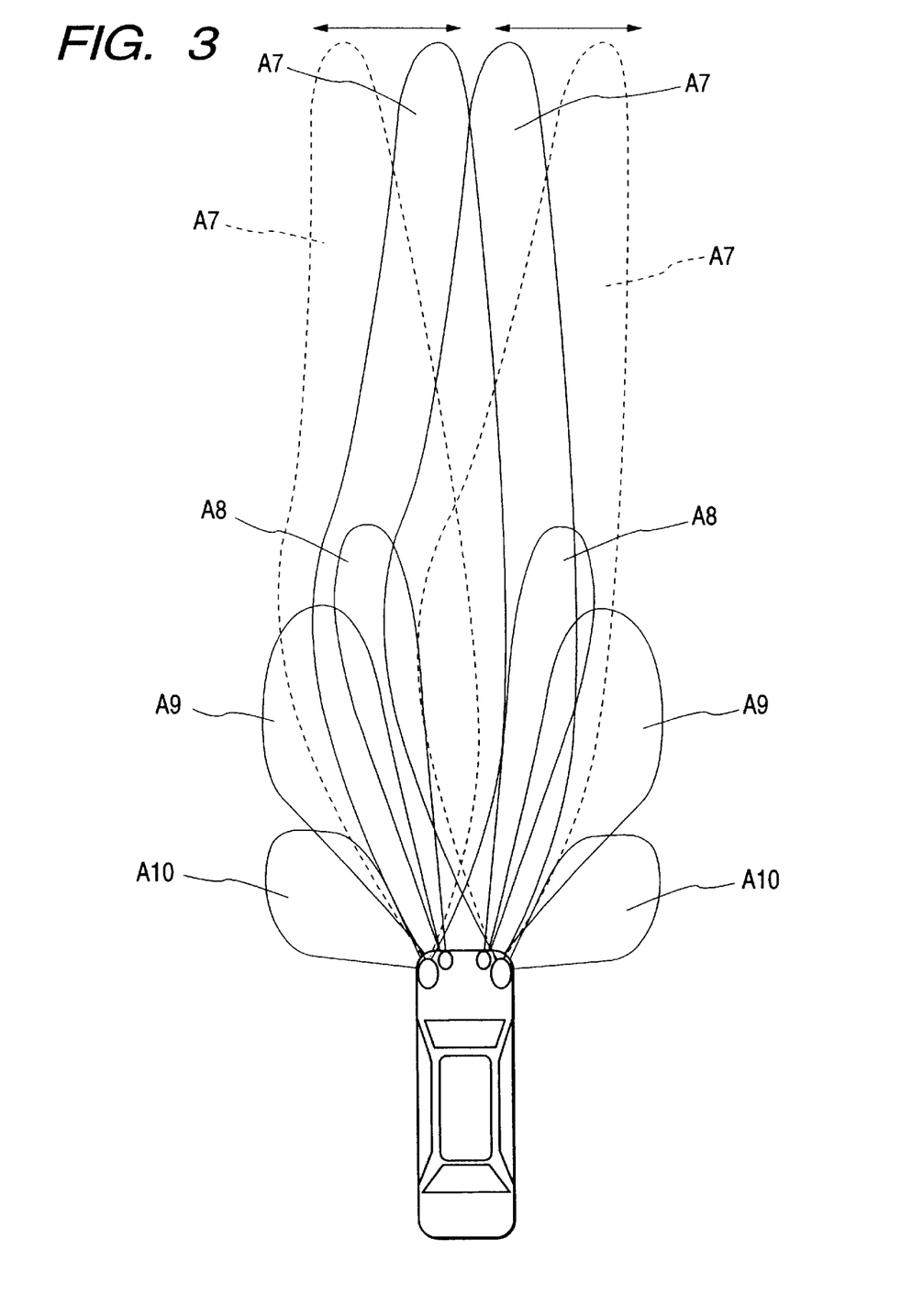
FIG. 3 is a schematic view of the illumination ranges of the respective lamps when viewed from above the vehicle.
Figure 4:
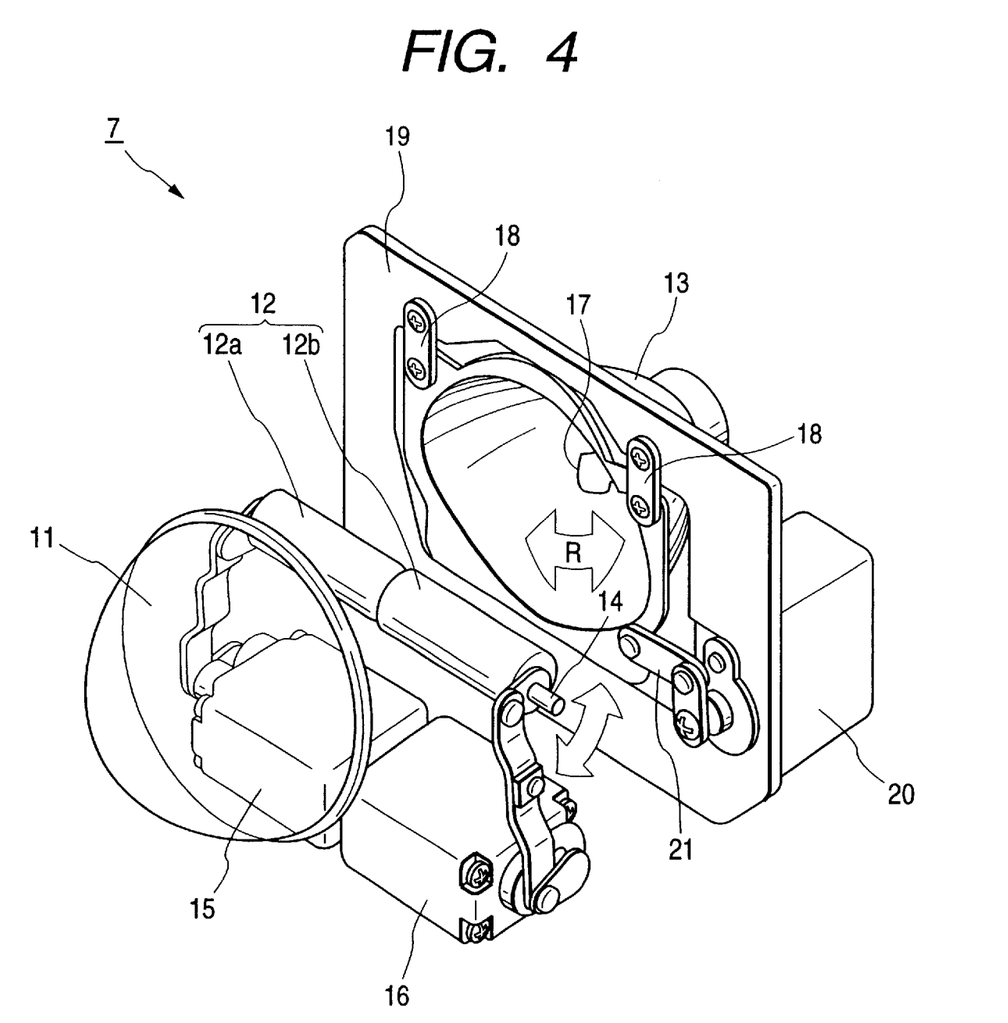
FIG. 4 is a perspective view of an example of the structure of a head lamp employed in the lighting device.

FIGS. 2 to 4 show an embodiment of the present invention applied to a lighting device for a car. An arrangement of lamps are mounted on one corner (left side corner) of the car. The lamps include a head lamp 7, a rain lamp 8, a bending lamp 9, and a cornering lamp 10.

The head lamp 7 is positioned rather near to the side portion of the vehicle front portion, while the rain lamp 8 is arranged at a position which is lateral of and in front of the head lamp 7. The bending lamp 9 is situated below the rain lamp 8, and the cornering lamp 10 is arranged in the side surface portion of the vehicle and below the head lamp 7.

The lamps function as follows. The head lamp 7 plays a major role in distributing the light of a passing beam or a running beam. The rain lamp 8 is a combination lamp in that it illuminates the corners of the road and illuminates in the rainy weather. The bending lamp 9 illuminates the corners of the road when the vehicle runs at low speeds. The cornering lamp 10 illuminates the road at an intersection.

In the present embodiment, as will be discussed later, the head lamp's light distribution is variably controlled. On the other hand, the remaining lamps have light distributions that are fixed.

FIG. 3 schematically shows the illumination ranges of the lamps of the lighting device, when viewed from above. Areas A7, A7 indicate the illumination ranges of the left and right head lamps 7. The head lamps 7 illuminate farthest in front of the vehicle, and have respective optical axes that are movable in the horizontal direction (see arrow marks shown in FIG. 3) in a given angular range, for example, in the range of −5° (left) to +5° (right). That is, as shown by broken lines in FIG. 3, the head lamp 7 on the right has an optical axis that is moveable to the right; and, the head lamp 7 on the left has an optical axis that is moveable to the left. Preferably, the optical axes are moved according to the variations in the steering angle caused by the operation of a steering wheel.

Areas A8, A8 indicate the illumination ranges of the right and left rain lamps 8, which illuminate the surface of the road that is nearer to the vehicle than the road surface illuminated by the head lamps 7. Specifically, the rain lamp 8 arranged in the front and left portion of the vehicle, where the Road Traffic Law specifies that vehicles keep to the left, illuminate a white line about 20 m (meters) ahead of a vehicle line side, whereas the rain lamp 8 arranged in the front and right portion of the vehicle illuminates a center line and a white line drawn on the road shoulder under the condition that its glare does not give a dazzling light to an oncoming vehicle.

Areas A10, A10 indicate the illumination ranges of the right and left cornering lamps 10, which extend from the obliquely forward direction of the vehicle (an angular direction of about 45° with respect to the advancing direction of the vehicle) to the lateral side of the vehicle (an angular direction of about 90° with respect to the advancing direction of the vehicle).

Areas A9, A9 indicate the illumination ranges of the right and left bending lamps 9, which cover the ranges that are situated between the areas A8, and A10.

As shown in FIG. 3, when all of the lamps are turned on, they illuminate a wide range in front of the vehicle.

Next, with reference to FIGS. 4 to 10, a description will be given of the examples of the lamp structures.

FIG. 4 shows a head lamp 7 of a projector type, which includes a projection lens 11, a shade 12, and a reflecting mirror 13. The head lamp also includes a drive mechanism to change the attitudes of the shade 12 and the reflecting mirror 13. Accordingly, the height (upper limit position) of the lamp's light distribution pattern is changeable, and the lamp's optical axis is moveable in the right and left directions.

Figure 14:
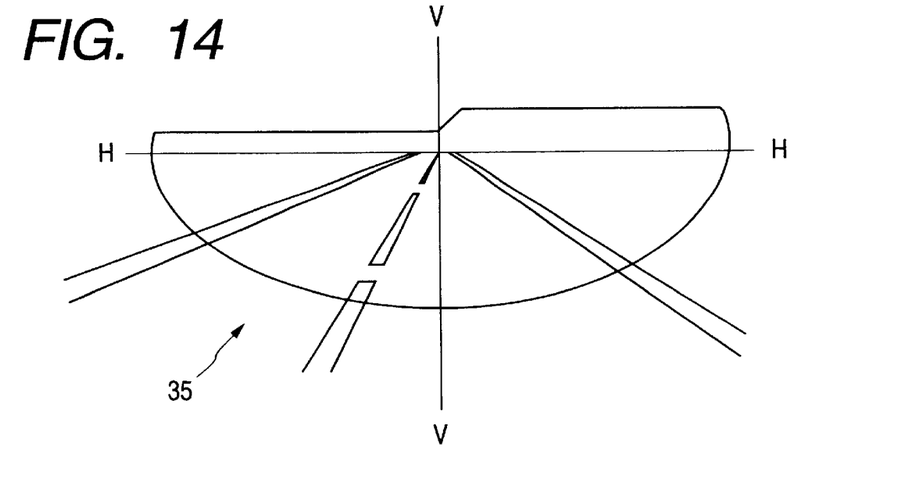

The shade 12 includes a cylindrical portion 12a that specifies the height (upper limit position) of the light distribution pattern on its own vehicle side, and a cylindrical portion 12b that specifies the height (upper limit position) of the light distribution pattern on the oncoming vehicle side. Two rotary shafts 14, 14 (only one of them is shown) are disposed at positions eccentric with respect to the centers of the two cylindrical portions 12a, 12b. The two rotary shafts project laterally from their respective cylindrical portions, and are respectively rotated by their associated actuators 15,16. Thus, the respective heights of the two cylindrical portions can be specified. As shown in FIG. 14, the light distribution pattern is projected as the inverted image of the shade 12.

The head lamp 7 also includes a light source 17 mounted on the reflecting mirror 13. The light emitting portion of the light source 17 is situated on the optical axis of the reflecting mirror 13, within a recessed portion formed in the reflecting mirror 13. The reflecting mirror 13 may include a reflecting surface such as an elliptic-parabolic reflecting surface, or an ellipsoid of revolution.

The lamp 7 also includes a drive mechanism, for driving the reflecting mirror 13, in which an upper portion of the reflecting mirror 3 is mounted through two parallel links 18, 18 on a support member 19. The reflecting mirror 13 is rotatable in a direction shown by an arrow mark R (FIG. 4) by an L-shaped rotary link 21. The L-shaped rotary link 21 extends from an actuator 20 fixed to the support member 19 to the peripheral edge portion of the reflecting mirror 13. This drive mechanism shifts the optical axis of the reflecting mirror 13 in the right and left direction. Accordingly, the illuminating direction of the lamp can be turned to a desired direction.

FIGS. 5 to 10 show examples of lamps, other than the head lamp 7. Namely, FIGS. 5–10 show the rain lamp 8, bending lamp 9, and cornering lamp 10, which have a general structure when used in a lighting device for a car. That is, these lamps include a lens, a reflecting mirror, and a light source. These lamps also have a fixed light distribution, as opposed to the variable light distribution described with respect to the head lamp 7. The light distribution may be decided by cooperative optical operation of a lens step disposed in the lens and the reflecting mirror; or, the lens may be composed of a plain-glass lens, or the lens may be formed in an almost plain-glass state and only a small lens step may be formed in the lens, while most of the light distribution may be specified only by the design of the shape of the reflecting mirror.

Figure 5:
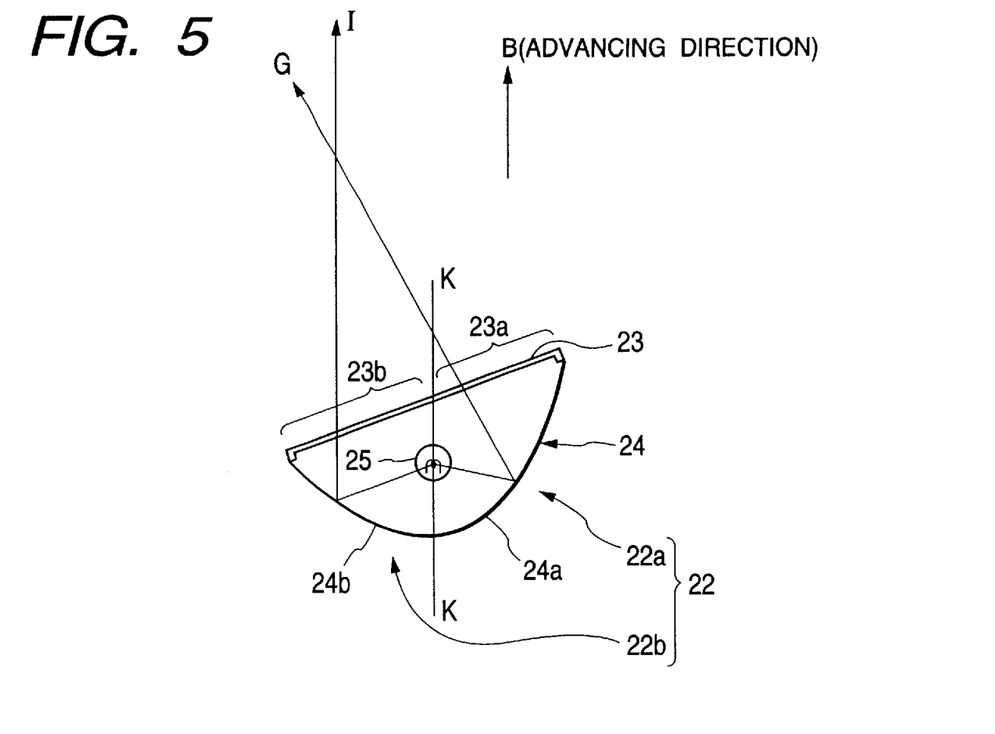
FIG. 5 is a schematic view of a lamp which is composed of two illuminating portions.

FIG. 5 is a horizontal section view of a lamp 22 (other than the head lamp 7) that is arranged on the left side of the front portion of the vehicle. The lamp 22, which includes a lens 23, a reflecting mirror 24 and a light source 25, is divided to two illuminating portions 22a and 22b by a vertical surface containing the main light axis K-K of the lamp 22. That is, the illuminating portion 22a includes a lens portion 23a and a reflecting portion 24a. These two portions 23a, 24a cooperate, such that the light emitted from the light source 25 (arrow mark G) illuminates in a forward and left oblique direction with respect to the advancing direction of the vehicle. On other hand, the illuminating portion 22b includes a lens portion 23b and a reflecting portion 24b. These two portions 23b, 24b cooperate, such that the light emitted from the light source 25 (arrow mark I) illuminates in a direction substantially parallel to the advancing direction of the vehicle. By the way, the illuminating directions G, I of the illuminating portions 22a, 22b depend on how the optical axes of the respective reflecting portions 24a, 24b are set. That is, the optical axis of the reflecting portion 24a is set in parallel to the arrow mark G, while the optical axis of the reflecting portion 24b is set in parallel to the arrow mark I.

Figure 6:
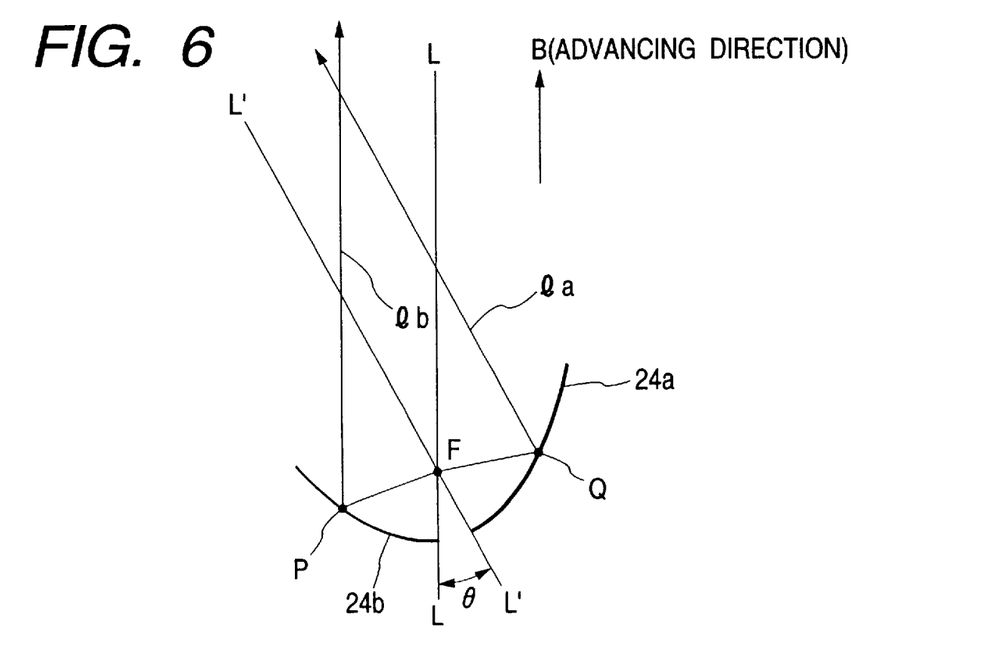
FIG. 6 is a schematic view of an example of a lamp composed of two illuminating portions, each including a reflecting portion formed in a paraboloid of revolution.

FIG. 6 shows an example in which the reflecting surface of the reflecting portion 24b is formed in a paraboloid of revolution, and its axis of rotational symmetry, that is, an optical axis L-L is defined so as to extend along the advancing direction B of the vehicle (see 1b at a point P). The reflecting surface of the reflecting portion 24a is formed in a paraboloid of revolution, and its axis of rotational symmetry, that is, an optical axis L'-L' is inclined at an angle of θ with respect to the optical axis L-L (see 1a at a point Q).

Figure 7:
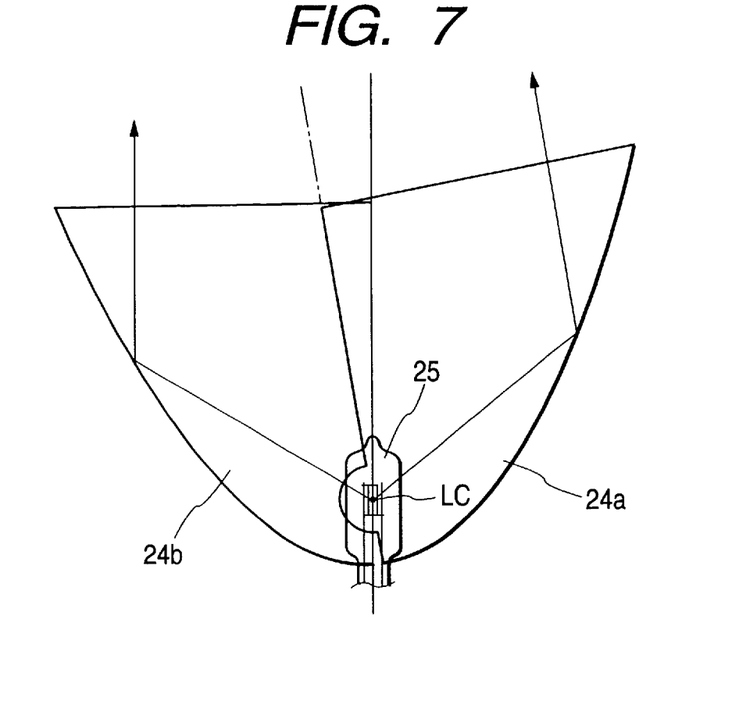
FIG. 7 shows an example of such lamp in which the rotation center axis of its reflecting portion 24a is formed of a vertical axis passing through the light emitting center point LC of a light source.
Figure 8:
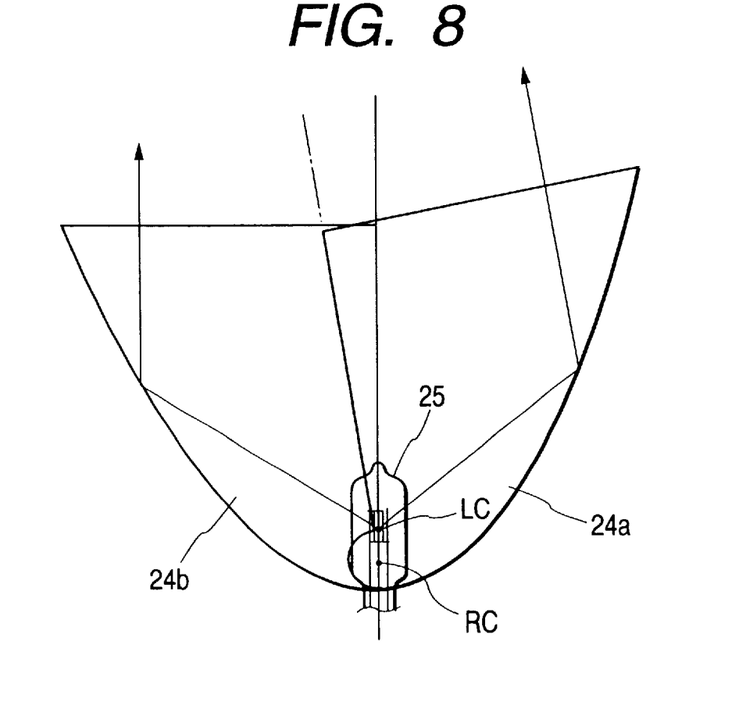
FIG. 8 shows an example of such lamp in which the rotation center axis of its reflecting portion 24a is formed of a vertical axis passing through a point RC located behind the light emitting center point LC of the light source.

Also, a reflecting mirror may have a part that is rotatable about a given axis to thereby turn the optical axis to a desired direction. For example, as shown in FIG. 7, the rotational center axis of the reflecting portion 24a coincides with a vertical axis which passes through the light emitting center point LC of the light source 25 and extends in a direction perpendicular to the sheet surface of FIG. 7. In another example, as shown in FIG. 8, the rotational center axis of the reflecting portion 24a coincides with a vertical axis which passes through a point RC located behind the light emitting center point LC of the light source 25. In both examples, the reflecting portion 24b remains fixed, while the reflecting portion 24a has a variable (or adjustable) attitude. The attitude of the reflecting portion 24a is varied by drive means such as an actuator to thereby illumination light in a desired direction.

By the way, in the rain lamp 8, bending lamp 9 and cornering lamp 10, as well as in the head lamp 7, there may be employed a structure which has a function to control the light distribution of the lamp in a variable manner. Such a structure is shown, for example, in FIGS. 9 and 10.

Figure 9:
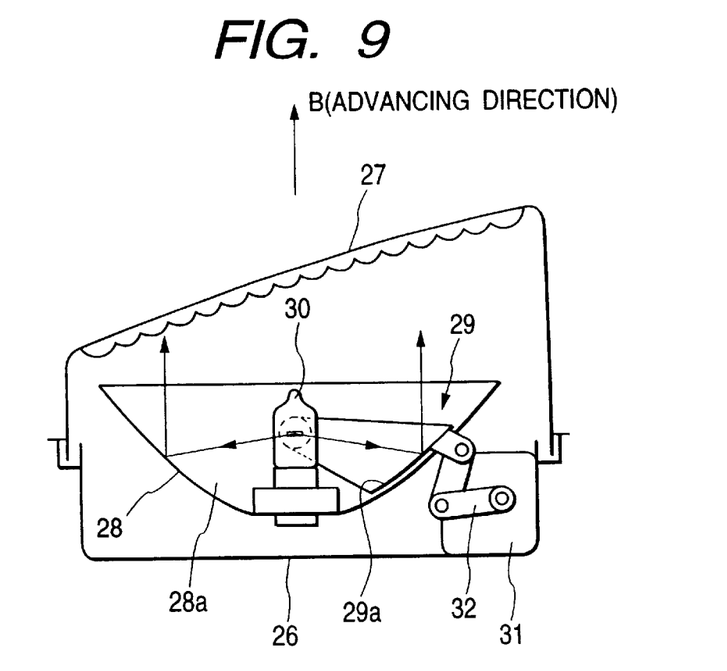
FIG. 9 shows a state of the lamp in which the respective optical axes of its fixed and movable reflecting mirrors both face forwardly of the vehicle.
Figure 10:
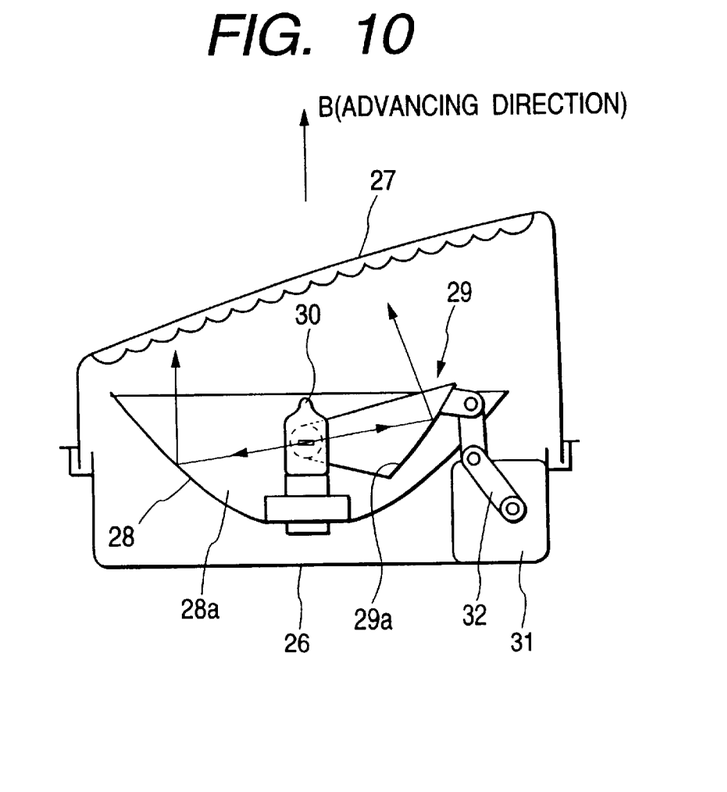
FIG. 10 shows a state of the lamp in which its movable reflecting mirror is specified in a direction inclined with respect to a vehicle advancing direction B.

FIGS. 9 and 10 show horizontal section views of a lamp having a lamp body 26 and a lens 27 for covering the opening of the lamp body 26. The lamp body 26 and the lens 27 define a lamp space in which a fixed reflecting mirror 28 is disposed. A movable reflecting mirror 29 is disposed inside the fixed reflecting mirror 28. The moveable reflecting mirror 29 has a rotational center axis that passes through the light emitting center of a light source 30 and extends perpendicular to the sheet surface of FIG. 9 or FIG. 10. The movable reflecting mirror 29 is coupled to an actuator 31 through a link member 32. Accordingly, the actuator may rotate the moveable reflecting mirror 29 to obtain different types of light distributions. For example, as shown in FIG. 9, the optical axes of the reflecting surface 28a of the fixed reflecting mirror 28 and the reflecting surface 29a of the movable reflecting mirror 29 both extend in the vehicle advancing direction (arrow mark B). But as shown in FIG. 10, the optical axis of the reflecting surface 29a is specified in a direction inclined with respect to the vehicle advancing direction B because the movable reflecting mirror 29 is rotated at a desired angle by the actuator 31.

In addition, drive means, for driving optical members (such as an inner lens and a shade), may be disposed within a lamp to control the light distribution of the lamp. Such techniques are convenient in that they realize the functions of a plurality of lamps in a single lamp. For example, a single lamp, which is capable of controlling its light distribution, may perform the functions of a bending lamp and a cornering lamp.

Next, a description will be given of the relationship between illumination the illumination control modes and the illumination states of the respective lamps.

In the present embodiment, the illumination control is divided to the following modes:

(i) City area running mode;

(ii) Suburbs running mode; and (iii) High-speed running mode.

The city area running mode (i) is for a relatively low-speed running operation, which makes it possible to recognize a road user such as a pedestrian. The city area running mode (i) has the following illuminating objects:

a) Illuminate in front of the vehicle up to a brake distance at a running speed (exactly, the sum of an idle running distance and a brake distance, for example, about 20 m at 40 km/h).

b) enable confirmation of an oncoming vehicle line and a side walk on its own vehicle line side sufficiently when running in a two-lane roadway.

The suburbs running mode (ii) makes it possible to confirm an obstacle and the curb in a middle-speed running operation. This mode has the following objects.

a) Illuminate in front of the vehicle up to a brake distance at a running speed (for example, about 75 m at 80 km/h).

b) Secure an illumination range of a given width (about 6 m to 10 m) with own vehicle as a reference in a two-lane roadway.

The high-speed running mode (iii) is for a vehicle running operation at a high speed of 80 km/h or more. This mode has the following objects:

a) Allow recognition of objects fallen onto the ground and illuminate in front of the vehicle up to a fallen object avoidable distance (for example, about 110 m).

b) Avoid giving a leading vehicle a dazzling light (for example, the illumination of the light onto the door mirror of the leading vehicle).

Figure 11:
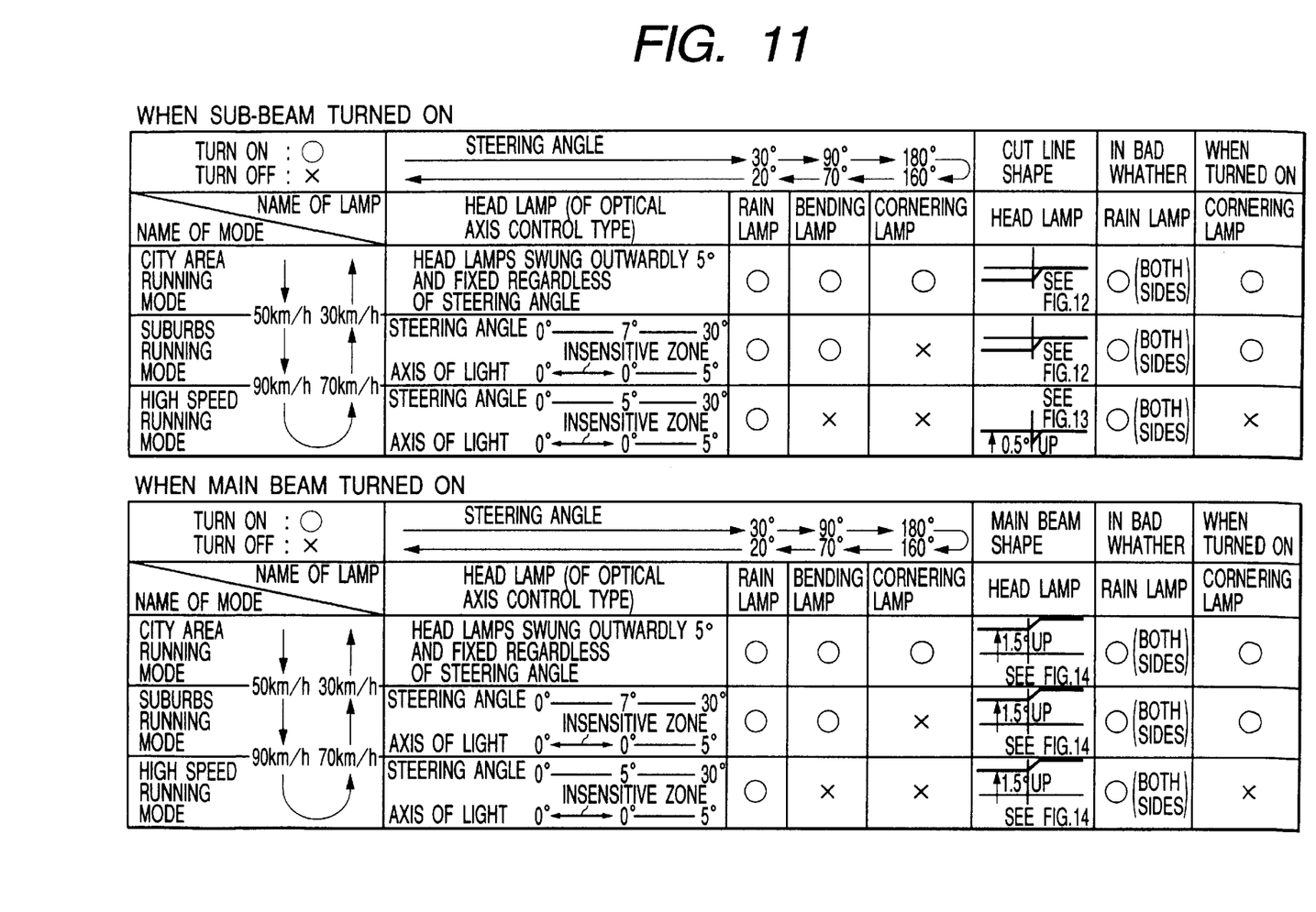
FIG. 11 shows two tables for explaining the examples of control over the respective lamps.

FIG. 11 shows two tables which set forth the control examples of the respective lamps. The upper table shows the examples of the respective modes and the states of the lamps as to turning-on a so called sub-beam (or a low beam) when the passing beams are under radiation. The lower table shows the examples of the respective modes and the states of the lamps as to turning-on a so called main beam (or a high beam) when the running beams are under radiation.

In the tables, the mark "O" designates turn-on and the mark "X" designates turn-off. The term "steering angle" designates the steering angle of a steering wheel (only one of the left turn and the right turn is shown). The term "turn-on time" expresses the turn-on (blinking) time of a turn signal lamp. The term "bad weather time" includes a rainy weather time and a snowy weather time. And, in transitions between the respective modes, the threshold values of the vehicle speed differ in the speed increasing and decreasing times. That is, in the speed increasing time, a transition from the city area running mode to the suburbs running mode is specified by a threshold value of 50 km/h, and a transition from the suburbs running mode to the high-speed running mode is specified by a threshold value of 90 km/h. On the other hand, a transition from the high-speed running mode to the suburbs running mode is specified by a threshold value of 70 km/h, and a transition from the suburbs running mode to the city area running mode is specified by a threshold value of 30 km/h.

The steering angle threshold values are different in the angle increasing and decreasing times. That is, threshold values of 30°, 90°, and 180° are set in the increasing direction of the steering angle. On the other hand, the threshold values of 160°, 70°, and 20° are set in the decreasing direction of the steering angle.

Therefore, for example, in the vehicle straight running time in the city area running mode, only the head lamps 7 are turned on, while the optical axes of the right and left head lamps 7 are respectively swung outwardly by an angle of 5° and fixed in these states regardless of the steering angles. As shown in FIG. 3, the head lamp illuminate the areas A7 and A7 expressed by broken lines. That is, the light axis of the right head lamp is moved to the right by an angle of 5° and remains held in this state, while the light axis of the left head lamp is moved to the right by an angle of 5° and remains held in this state. In this way, the head lamps have a wide illumination range.

Also, in the city area running mode, if the steering angle reaches an angle of 30° in the left or right turn, then the rain lamp 8 is turned on. If the steering angle further increases up to an angle of 90°, then the bending lamp 9 is turned on. If the steering angle reaches an angle of 180°, then the cornering lamp 10 is turned on, and in this state, all the lamps are turned on. Subsequently, as the steering handle is returned, if the steering angle goes below an angle of 160°, then the cornering lamp 10 is turned off. If the steering angle goes below an angle of 70°, then the bending lamp 9 is turned off. If the steering angle goes below an angle of 20°, then the rain lamp 8 is turned off. In this manner, as the steering angle increases, the respective lamps are turned on one by one, so as to expand the illuminating range of the lighting device. Thus, it is possible to secure the luminance and illuminating range sufficient to assure safety as the vehicle runs through a heavily traveled place.

In the suburbs running mode, when the vehicle is running straight, only the head lamp 7 is turned on, while the optical axis of the head lamp is moved according to the steering angle. For example, as the steering angle increases gradually from an angle of 0° (front position) toward an angle of 30°, the direction of the optical axis of the head lamp is varied continuously from an angle of 0° to an angle of 5° (absolute value). Preferably, in the steering angle range of 0° to 7°, an insensitive zone is provided in which the direction of the optical axis of the head lamp does not vary. That is, the insensitive zone prevents the distribution light from varying unnecessarily with respect to minor steering angle changes which may result from play in the steering handle, for example.

Also, during the suburbs running mode, when the vehicle turns to the left or to the right, if the steering angle reaches an angle of 30°, then the rain lamp 8 turns on. If the steering angle increases further up to an angle of 90°, then the bending lamp 9 turns on. However, even if the steering angle reaches an angle of 180°, the cornering lamp 10 remains off. On the other hand, if the steering wheel is returned and thus the steering angle goes below an angle of 70°, then the bending lamp 9 turns off. If the steering angle goes below an angle of 20°, then the rain lamp 8 turns off.

In the high-speed running mode, when the vehicle is running straight, only the head lamp 7 is turned on, while the optical axis of the head lamp is, moved according to the steering angle. For example, as the steering angle increases gradually from an angle of 0° (front position) toward an angle of 30°, the direction of the optical axis of the head lamp is varied continuously from an angle of 0° to an angle of 5° (absolute value). Preferably, in the steering angle range of 0° to 5°, an insensitive zone is provided in which the direction of the optical axis of the head lamp does not vary. That is, the insensitive zone prevents the distribution light from varying unnecessarily with respect to minor steering angle changes which may result from play in the steering handle, for example.

The insensitive zone is provided with respect to the steering angle for the suburbs running mode and high-speed running mode for the following, reasons. First, a driving condition, in which the steering angle varies slightly, includes, for example, a slightly snaking operation that occurs in a single lane or a driving operation performed so as to avoid a small obstacle on the road. In such minute variations in the steering angle, there is a low probability that the vehicle-can change its running lane or can turn to another road. Thus, in these cases, there is no need to vary the direction of the optical axis of the head lamp according to the small changes in the steering angle. Rather, there is a need to prevent harmful effects caused by changing the direction of the optical axis of the head lamp excessively.

During the high-speed running mode, if the steering angle reaches an angle of 30°, then the rain lamp 8 turns on. But even if the steering angle exceeds an angle of 90°, the bending lamp 9 and cornering lamp 10 remain off.

Figure 12:
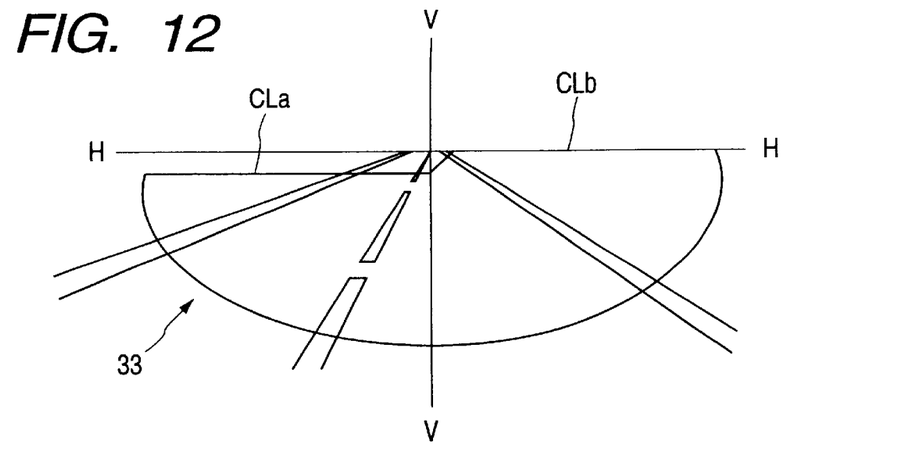

FIG. 12 shows a light distribution pattern 33 in the cit y area running mode and in the suburbs running mode while the sub-beam relating to the head lamp 7 is on. In FIG. 12, the line H—H shows a horizontal line and the line V—V shows a vertical line.

As shown in FIG. 12, when the Road Traffic Law obliges vehicles to keep to the right, a cut line (or a cutoff line) CLa on the oncoming vehicle lane side (the left side of the line V—V) is situated slightly below (if it is displayed by angles, by an angle of –0.5°) the horizontal line H—H. Also, a cut line (or a cutoff line) CLb on the own vehicle lane side (the right side of the line V—V) is situated so as to extend substantially along the horizontal line H—H.

Figure 13:
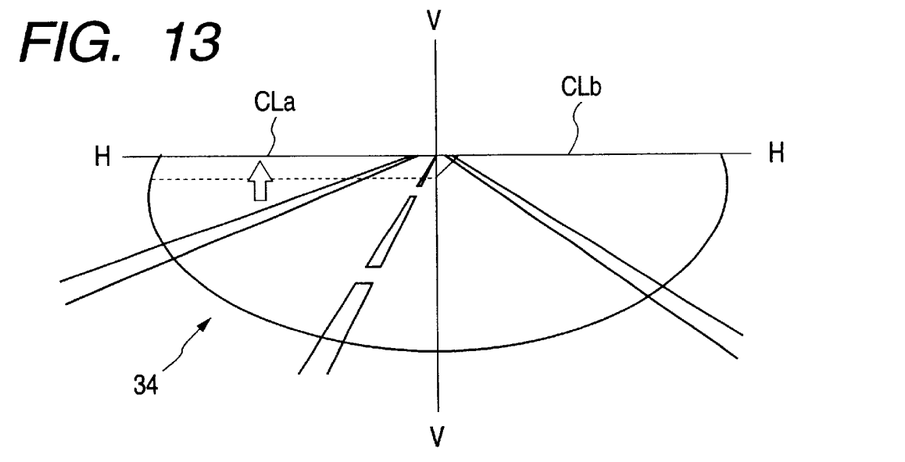

FIG. 13 shows a light distribution pattern 34 in the high-speed running mode while the sub-beam is on. In FIG. 13, the lines H—H and V—V are similar to those previously described. Since the left-side cut line CLa is raised, it extends substantially along the horizontal line H—H. Therefore, the light distribution pattern 34 allows the driver to observe visually farther away on the oncoming vehicle lane of the road.

FIG. 14 shows schematically a light distribution pattern 35 of the head lamp 7 while the sub-beam is on, that is, under radiation. In this case, the light distribution pattern 33 shown in FIG. 12 is raised as a whole by an amount equivalent to a given height increase (if it is displayed by angles, an amount equivalent to an angle of 1.5°).

In bad weather, the two rain lamps 8 respectively situated left and right in the vehicle front portion are turned on, and when the blinking indication of the turn signal lamp is issued, the cornering lamp 10 is turned on in modes other than the high-speed running mode.

The control system, for controlling the switching operations of the respective modes described above, may be a hand-operated (manually operated) system, an automatic system, or a combined system which consists of a combination of the hand-operated and automatic systems.

According to the hand-operated system, a driver executes the mode switching operation depending on his or her judgment of the running conditions by using a 3-mode switching switch. Specifically, in this system, the judgment of the running conditions is purely left to the driver. Recommendable modes according to the speeds and running environments of the vehicle may be displayed to assist the driver in selecting the running mode.

According to the automatic system, the modes are switched in the manner shown in FIG. 11, i.e., in accordance with a detect signal on the running speed of the vehicle, which is sent by a vehicle speed sensor.

In addition to using a hand-operated switch, the rain lamp may be turned on and off via the operation of an operation switch for a windshield wiper.

In the present embodiment, and with reference to the structure shown in FIG. 1, the running direction detect means 3 corresponds to a steering sensor (a sensor that detects an operation direction and an angle in connection with the driver's operation of a steering wheel), and the vehicle speed detect means 4 corresponds to a vehicle speed sensor. Also, the illumination control means 5 can be easily realized by an ECU (electronic control unit) incorporated into a CPU (central processing unit).

In the present embodiment, the turn-on and optical axis control of the head lamp in the vehicle straight running operation are specified in such a manner that they vary according to the respective modes. However, the invention is not limited in this way. For example, the turn-on and optical axis control of the head lamp may be specified in a unified manner regardless of the modes. In another example, the turn-on and optical axis control of the head lamp may specified differently between in the passing beam radiating time and in the running beam radiating time.

Also, the width of the insensitive zone relating to the steering angle (an angular width to be measured using the steering center, that is, the steering angle of 0° as the reference thereof) is set in such a manner that it varies according to the modes. But, the invention is not limited in this way. Specifically, the width of the insensitive zone may vary according to the vehicle speed.

It may be advantageous to vary the insensitive zone width according to vehicle speed. For example, if the movement of the optical axis is controlled faithfully (without an insensitive zone, or with an insensitive zone having a constant width) in correspondence to the steering angle, and if the vehicle speed is slow, then the driver may be overly sensitive to the optical axis control. On the other hand, if the vehicle speed is fast, the driver's sensitivity to the optical axis control is substantially lowered. More specifically, this shift in driver sensitivity results from the tendency that in the low-speed running operation, the driver's steering corrections are generally large. But as the vehicle speed increases, such steering corrections become small.

The insensitive zone width may vary according to the vehicle speeds in following ways:

(a) the insensitive zone width may change in a stage by stage manner according to the vehicle speeds;

(b) the insensitive zone width may change continuously according to the vehicle speeds; and (c) the insensitive zone width may change via a combination of the above two techniques.

Consider the following exemplary scenario of the stage by stage technique (item (a)). As the vehicle speed increases, the width (angular width) of the insensitive zone is 9° before the vehicle speed reaches 50 km/h, decreased to 7° when the vehicle speed exceeds 50 km/h, and further decreased to 5° when the vehicle speed reaches 90 km/h. On the other hand, as the vehicle speed decreases, the width of the insensitive zone increases to 7° when the vehicle speed lowers down to 70 km/h, and further increases to 9° when the vehicle speed lowers down to 30 km/h. Since different threshold values are set for the vehicle speed in the increasing and decreasing directions of the vehicle speed, thereby providing a hysteresis characteristic in the lamp (head lamp), the sensitivity of the head lamp to the illuminating direction control with respect to the steering angle is enhanced at fast vehicle speeds, and lowered at slow vehicle speeds. In this way, the illumination control harmonizes with the feeling of the driver.

Also, when the vehicle speed is equal to or less than a certain threshold value, it may be effective to stop (or remove) the linking control between the steering operation and the illuminating direction of the lamp, thereby preventing the illumination state of the lamp from being controlled in correspondence to the steering operation.

Consider the following exemplary scenario of the continuous technique (item (b)). The insensitive zone width may vary along a given control line (a straight line or a curved line represented in a graph in which the vehicle speed is expressed by the horizontal axis and the insensitive zone width is expressed by the vertical axis) according to the vehicle speed. That is, the insensitive zone has a width of 9° when the vehicle speed is 0 km/h. As the vehicle speed increases, the width of the insensitive zone gradually decreases. The width of the insensitive zone decreases to about 5° when the vehicle speed reaches about 90 km/h.

Consider the following exemplary scenario of the combination technique (item (c)). The range of the vehicle speed is divided into a plurality of blocks. The stage by stage technique (item (a)) is used in a certain block, while the continuous technique (item (b) is used in another block. Alternatively; for each of the blocks, the order of priority between the two techniques (item a and item b) is previously specified.

By the way, instead of changing the insensitive zone width according to the vehicle speed, the angle (in more particular, the illuminating direction and angle) of the illumination beam with respect to the steering angle may be controlled variably according to the vehicle speed. This type of control solves the control sensitivity problem caused by the vehicle speed, thereby realizing illumination control that is congruous with the feeling of the driver. Consider a graph in which the steering angle is expressed by the horizontal axis and the control angle of the illuminating beam is expressed by the vertical axis. The gradient of a control line that specifies the relationship between the steering angle and the illuminating beam control angle may vary according to the vehicle speed. In particular, the gradient of the control line increases as the vehicle speed increases. For example, the illuminating beam control angle with respect to the steering angle may be determined by a plurality of straight lines that respectively correspond to the vehicle speeds or the vehicle speed ranges. Since the gradients of the straight lines increase as the vehicle speed increases, the control sensitivity of the lamp becomes enhanced as the vehicle speed increases. It is to be appreciated that this technique may be used independently, or combined with any of the above-mentioned insensitive zone width control techniques to obtain further enhanced effects.

The invention has the following effects. According to a first aspect of the invention, since the combinations of the illumination ranges given by a plurality of lamps changes according to the running direction (or the steering angle of a vehicle) and the speed of the vehicle to control the illuminating direction and range of the lamps, thereby specifying the light distribution of the lighting device in front of the vehicle, proper control over the light distribution is always realized for the running condition of the vehicle.

According to a second aspect of the invention, by reducing the number of lamps to be turned on as the vehicle speed increases, thereby controlling the light distribution of the lighting device in such a manner that the illumination range of the lighting device is narrowed, it is possible to secure an illumination range that corresponds to the running speed of the vehicles and is suitable for the field of view of a driver.

According to a third aspect of the invention, when the vehicle runs straight, only the lamps that illuminate in the advancing direction of the vehicle are turned on. And when the running direction (or steering angle) of the vehicle varies, additional lamps are turned on one by one, such that as the variation increases, the lighting devise illuminates further in a direction where the vehicle is going to turn. Accordingly the lighting device expands the illuminating range gradually. Accordingly, when the vehicle turns to the right or left at an intersection, or when the vehicle runs in a curved road, a sufficient illumination range is secured.

According to a fourth aspect of the invention, in bad weather, by turning on the lamps for illuminating mainly a white line on a road or a road shoulder, the visually confirming performance of the lighting device in front of the vehicle is enhanced.

According to a fifth aspect of the invention, the illumination range of the lighting device in front of the vehicle and on the lateral sides of the vehicle is divided into a plurality of blocks, and the lamps differing in the illuminating direction are allowed to illuminate individually their associated blocks, thereby specifying the whole illumination range of the lighting device. Due to this, the lamps may be individually designed in the light distribution, which facilitates the design of the lamps. Also, this feature eliminates the need to structure the lamps so as to provide the light distribution variable control functions. Therefore, the lamp structures are simplified, which reduces the number of parts and the manufacturing cost of the lighting device.

According to a sixth aspect of the invention, a plurality of lamps are assembled together in a simple fashion so as to illuminate a sufficiently wide range which extends from forwardly of the vehicle to laterally of the vehicle. The plurality of lamps includes (1) a main lamp for illuminating in the vehicle advancing direction, (2) a subordinate lamp for illuminating mainly a white line on a road or the shoulder of a road, (3) a laterally illuminating lamp having an illumination range which extends from obliquely forwardly of the vehicle to laterally of the vehicle, and (4) an auxiliary lamp having an illumination range which is situated between the illumination range of the subordinate lamp and the illumination range of the laterally illuminating lamp.

According to a seventh aspect of the invention, the lamps are turned on (an off) by increasing (and decreasing) the light quantity gradually, according to variations in the running direction of the vehicle (or in the steering angle of the vehicle). Thus, the light quantity does not vary suddenly due to the sudden turn-on or turn-off of the lamps, which reduces harmful effects on the driver of an oncoming vehicle and a pedestrian.

The above and other features of the invention including various and novel details of construction has been particularly described with reference to the accompanying drawings and pointed out in the following claims. It will be understood that the particular lighting device is shown by way of illustration only and not as a limitation of the invention. The principles and features of this invention may be employed in varied and numerous embodiments without departing from the scope of the invention.

What is claimed is:

1. A lighting device for a vehicle, the lighting device comprising:
   a plurality of lamps disposed in a front portion of the vehicle;
   running direction detect means for detecting one of a vehicle running direction and a vehicle steering angle;
   vehicle speed detect means for detecting a vehicle speed; and
   illumination control means for specifying the turn-on and turn-off of said lamps according to detect signals output from said running direction detect means and said vehicle speed detect means to change the combinations of the illumination ranges of said lamps.

2. A lighting device for a vehicle as set forth in claim 1, wherein said illumination control means reduces the number of lamps turned on as said vehicle speed detected by said vehicle speed detect means increases.

3. A lighting device for a vehicle as set forth in claim 1, wherein said illumination control means
   (1) turns on only lamps that face in a vehicle advancing direction when said running direction detect means determines that said vehicle is running straight, and
   (2) turns on additional lamps that do not face in said vehicle advancing direction when said running direction detect means determines that one of said vehicle running direction and said vehicle steering angle varies, and as said variation increases, turns on said additional lamps one by one so as to illuminate further a vehicle turning direction.

4. A lighting device for a vehicle as set forth in claim 1, further comprising: weather means for obtaining the weather in an area surrounding said vehicle,
   wherein, when said illumination control means receives a signal from said weather means and determines from said signal a weather change that decreases visibility, said illumination control means turns on lamps to illuminate a marker line on one of a road and a shoulder of said road.

5. A lighting device for a vehicle as set forth in claim 1, wherein said lighting device has an illumination range divided into a plurality of blocks, and said lamps have different illuminating directions with respect to each other so as to illuminate respective ones of said blocks individually.

6. A lighting device for a vehicle as set forth in claim 5, wherein said plurality of lamps include (1) a main lamp for illuminating in a vehicle advancing direction, (2) a subordinate lamp having an illumination range for illuminating a marker line on one of a road and a shoulder of said road, (3) a laterally illuminating lamp having an illumination range extending from obliquely forwardly of said vehicle to laterally thereof, and (4) an auxiliary lamp having an illumination range extending between the illumination ranges of said subordinate lamp and said laterally illuminating lamp.

7. A lighting device for a vehicle as set forth in claim 1, wherein, of said plurality of lamps, a first lamp and a second lamp have illumination ranges that one of overlap and are contiguous, and
   wherein, said illumination control means one of
      (1) turns on said first lamp and subsequently turns on said second lamp, such that a light quantity of said second lamp is increased according to variations in one of said vehicle running direction and said vehicle steering angle detected bar said running direction detect means, and (2) turns off said second lamp before turning off said first lamp, such that the light quantity of said second lamp is decreased according to variations in one of said vehicle running direction and vehicle steering angle detected by said running direction detect means.

8. A lighting device for a vehicle as set forth in claim 1, wherein said illumination control means controls said lamps to illuminate a sidewise direction in accordance with a signal from said running direction detect means when the vehicle speed is not more than a predetermined value.

9. A lighting device for a vehicle as set forth in claim 8, wherein said illumination control means does not control said lamps to illuminate a sidewise direction in accordance with a signal from said running direction detect means when the vehicle speed is not less than the predetermined value.

10. A lighting device for a vehicle as set forth in claim 1, wherein said lamps include at least one head lamp and an insensitive zone is provided in which the direction of the optical axis of the head lamp does not vary when a signal from said running direction detect means is in a predetermined range between a upper limit value and a lower limit value.

11. A lighting device for a vehicle as set forth in claim 10, wherein the predetermined range to define the insensitive zone is varied in accordance with a vehicle speed.

12. A lighting device for a vehicle as set forth in claim 1, wherein said lamps include right and left head lamp portions and the right and left head lamp portions are respectively swung and fixed outwardly at a predetermined angle regardless of a signal from said running direction detect means when a vehicle speed is not more than a predetermined value.

13. A lighting device for a vehicle as set forth in claim 1, wherein said lamps include right and left head lamp portions and the right and left head lamp portions are respectively swung variably in accordance with a signal from said running direction detect means when a vehicle speed is not less than a predetermined value.

14. A lighting device for a vehicle, the lighting device comprising:
    a plurality of lamps mounted on the vehicle;
    a first sensor that detects a vehicle turning direction;
    a second sensor that detects a vehicle speed; and
    a controller coupled to said first and said second sensors, wherein the controller turns said lamps on and off according to signals output from said first and said second sensors.

15. A lighting device for a vehicle as set forth in claim 14, wherein said controller reduces the number of lamps turned on as said vehicle speed detected by said second sensor increases.

16. A lighting device for a vehicle as set forth in claim 14, wherein said controller
    (1) turns on only lamps that face in a vehicle advancing direction when said first sensor determines that said vehicle is running straight, and
    (2) turns on additional lamps that do not face in said vehicle advancing direction when said first sensor determines that said vehicle turning direction varies, and as said variation increases, turns on said additional lamps one by one so as to illuminate further in said vehicle turning direction.

17. A lighting device for a vehicle as set forth in claim 14, further comprising:
    a third sensor that obtains the weather in an area surrounding said vehicle,
    wherein, when said controller receives a signal from said third sensor and determines from said signal a weather change that decreases visibility, said controller turns on lamps to illuminate a marker line on one of a road and a shoulder of said road.

18. A lighting device for a vehicle as set forth in claim 14, wherein said lighting device has an illumination range divided into a plurality of blocks, and said lamps have different illuminating directions with respect to each other so as to illuminate respective ones of said blocks individually.

19. A lighting device for a vehicle as set forth in claim 18, wherein said plurality of lamps include (1) a main lamp for illuminating in a vehicle advancing direction, (2) a subordinate lamp having an illumination range for illuminating a marker line on one of a road and a shoulder of said road, (3) a laterally illuminating lamp having an illumination range extending from obliquely forwardly of said vehicle to laterally thereof, and (4) an auxiliary lamp having an illumination range extending between the illumination ranges of said subordinate lamp and said laterally illuminating lamp.

20. A lighting device for a vehicle as set forth in claim 14, wherein, of said plurality of lamps, a first lamp and a second lamp have illumination ranges that one of overlap and are contiguous, and
    wherein, said controller one of
        (1) turns on said first lamp and subsequently turns on said second lamp, such that a light quantity of said second lamp is increased according to variations in said vehicle turning direction detected by said first sensor, and
        (2) turns off said second lamp before turning off said first lamp, such that the light quantity of said second lamp is decreased according to variations in said vehicle turning direction detected by said first sensor.

21. A lighting, device for a vehicle as set forth in claim 14, wherein said controller controls said lamps to illuminate a sidewise direction in accordance with a signal from said first sensor when the vehicle speed is not more than a predetermined value.

22. A lighting, device for a vehicle as set forth in claim 21, wherein said controller does not control said lamps to illuminate a sidewise direction in accordance with a signal from said first sensor when the vehicle speed is not less than the predetermined value.

23. A lighting device for a vehicle as set forth in claim 14, wherein said lamps include at least one head lamp and an insensitive zone is provided in which the direction of the optical axis of the head lamp does not vary when a signal from said first sensor is in a predetermined range between a upper limit value and a lower limit value.

24. A lighting device for a vehicle as set forth in claim 23, wherein the predetermined range to define the insensitive zone is varied in accordance with a vehicle speed.

25. A lighting device for a vehicle as set forth in claim 14, wherein said lamps include right and left head lamp portions and the right and left head lamp portions are respectively swung and fixed outwardly at a predetermined angle regardless of a signal from said first sensor when a vehicle speed is not more than a predetermined value.

26. A lighting device for a vehicle as set forth in claim 14, wherein said lamps include right and left head lamp portions and the right and left head lamp portions are respectively swung variably in accordance with a signal from said first sensor when a vehicle speed is not less than a predetermined value.

* * * * *